US009278442B2

(12) United States Patent
Tang et al.

(10) Patent No.: US 9,278,442 B2
(45) Date of Patent: Mar. 8, 2016

(54) FLOW CONTROL SCREEN FOR USE WITH HYDRAULIC ACCUMULATOR, HYDRAULIC HAMMER USING SAME, AND MANUFACTURING METHOD

(75) Inventors: Dennis Wai Man Tang, Hewitt, TX (US); Lauritz Pillers, Waco, TX (US)

(73) Assignee: Caterpillar Inc., Peoria, IL (US)

( * ) Notice: Subject to any disclaimer, the term of this patent is extended or adjusted under 35 U.S.C. 154(b) by 805 days.

(21) Appl. No.: 13/551,062

(22) Filed: Jul. 17, 2012

(65) Prior Publication Data

US 2014/0020920 A1 Jan. 23, 2014

(51) Int. Cl.
*B25D 9/00* (2006.01)
*F16L 55/04* (2006.01)
*B25D 9/14* (2006.01)

(52) U.S. Cl.
CPC ........... *B25D 9/145* (2013.01); *Y10T 29/49401* (2015.01)

(58) Field of Classification Search
CPC .............. B25D 9/145; Y10T 29/49401; F15B 2201/205; F15B 2201/3151
USPC ...................................................... 138/30, 41
See application file for complete search history.

(56) References Cited

U.S. PATENT DOCUMENTS

| | | | | |
|---|---|---|---|---|
| 2,387,598 | A * | 10/1945 | Mercier | 222/386.5 |
| 2,399,444 | A * | 4/1946 | Mercier | 138/30 |
| 2,874,721 | A * | 2/1959 | Mercier | 138/30 |
| 3,628,573 | A * | 12/1971 | Loliger et al. | 138/30 |
| 3,722,548 | A * | 3/1973 | Mercier | 138/30 |
| 3,948,288 | A * | 4/1976 | Mayer | 138/30 |
| 4,380,901 | A * | 4/1983 | Rautimo et al. | 60/418 |
| 4,552,227 | A * | 11/1985 | Wohlwend | 173/15 |
| 4,611,795 | A * | 9/1986 | Muzechuk | 267/140.13 |
| 4,909,490 | A * | 3/1990 | de Fontenay | 267/140.13 |
| 4,969,632 | A * | 11/1990 | Hodgson et al. | 267/140.11 |
| 5,028,038 | A * | 7/1991 | de Fontenay | 267/140.13 |
| 5,094,433 | A * | 3/1992 | Dan et al. | 267/140.13 |
| 5,279,120 | A * | 1/1994 | Sasaki | 60/413 |
| 6,019,134 | A * | 2/2000 | Onishi | 138/30 |
| 7,052,004 | B2 * | 5/2006 | Siemer et al. | 267/141 |
| 8,733,468 | B2 * | 5/2014 | Teipel et al. | 173/135 |
| 8,875,740 | B2 * | 11/2014 | Baltes | 138/30 |
| 2011/0192482 | A1 * | 8/2011 | Baltes | 138/30 |
| 2012/0138328 | A1 * | 6/2012 | Teipel et al. | 173/207 |

* cited by examiner

*Primary Examiner* — Andrew M Tecco
(74) *Attorney, Agent, or Firm* — Baker & Hostetler LLP

(57) ABSTRACT

A hydraulic accumulator includes an accumulator housing defining a gas reservoir and a liquid volume. A flexible membrane is positioned within the accumulator housing and separates the gas reservoir and the liquid volume. A flow control screen defines a wall of the accumulator housing, has a screen thickness, and includes an exterior face opposing a membrane engagement face. A first slot is formed through the exterior face and has a first slot depth that is less than the screen thickness. A second slot is formed through the membrane engagement face and has a second slot depth that is less than the screen thickness. The first slot and the second slot intersect to fluidly connect an exterior of the accumulator housing with the liquid volume.

17 Claims, 4 Drawing Sheets

FLOW CONTROL SCREEN FOR USE WITH HYDRAULIC ACCUMULATOR, HYDRAULIC HAMMER USING SAME, AND MANUFACTURING METHOD

TECHNICAL FIELD

The present disclosure relates generally to a flow control screen that may be used with a hydraulic accumulator, and more particularly to a flow control screen having slots extending partially through opposing faces of the flow control screen and intersecting to define fluid passages therethrough.

BACKGROUND

Hydraulic accumulators may be positioned along hydraulic circuits and may function as reservoirs for storing hydraulic fluid under pressure. As a result, specific amounts of hydraulic fluid may be stored under pressure to meet peak demands. In addition, hydraulic accumulators may function to maintain system pressure and/or reduce or absorb hydraulic shocks or pulsations. According to a particular application, hydraulic accumulators may be incorporated into the hydraulic system of a hydraulic hammer for various purposes, including the suppression of hydraulic shocks that may occur during valve closures. Typical operation of a hydraulic hammer includes the reciprocation of a piston using hydraulic pressure acting on opposing ends of the piston, as taught in U.S. Patent Application Publication No. 2012/0138328 to Teipel et al.

Hydraulic accumulators typically include a force, such as a spring, a weight, or a compressed gas, acting on the hydraulic fluid. Although various embodiments and configurations exist, hydraulic accumulators typically include a structure that permits a controlled flow of hydraulic fluid between the hydraulic system, or circuit, and a liquid volume within the hydraulic accumulator, which is acted on by the force. According to many embodiments, a wall of the hydraulic accumulator may include a large number of discrete openings facilitating the controlled fluid flow. Although such a flow control arrangement may provide acceptable flow, the costs of manufacture for machining the hundreds or thousands of discrete openings may be very high.

The present disclosure is directed to one or more of the problems or issues set forth above.

SUMMARY OF THE DISCLOSURE

In one aspect, a hydraulic accumulator includes an accumulator housing defining a gas reservoir and a liquid volume. A flexible membrane is positioned within the accumulator housing and separates the gas reservoir and the liquid volume. A flow control screen defines a wall of the accumulator housing, has a screen thickness, and includes an exterior face opposing a membrane engagement face. A first slot is formed through the exterior face and has a first slot depth that is less than the screen thickness. A second slot is formed through the membrane engagement face and has a second slot depth that is less than the screen thickness. The first slot and the second slot intersect to fluidly connect an exterior of the accumulator housing with the liquid volume.

In another aspect, a hydraulic hammer includes an elongate housing defining a centerline. A work tool is partially received in, and movable along the centerline with respect to, the elongate housing. A piston is received in the housing and is movable along the centerline between a downward stroke position in contact with the work tool and an upward stroke position out of contact with the work tool. A hydraulic circuit is supported within the elongate housing and configured to direct pressurized hydraulic fluid to move the piston between the upward stroke position and the downward stroke position. The hydraulic hammer also includes a hydraulic accumulator fluidly connected with the hydraulic circuit. The hydraulic accumulator includes an accumulator housing defining a gas reservoir and a liquid volume, and a flexible membrane positioned within the accumulator housing and separating the gas reservoir and the liquid volume. A flow control screen defines a wall of the accumulator housing, has a screen thickness, and includes an exterior face opposing a membrane engagement face. A first slot is formed through the exterior face and has a first slot depth that is less than the screen thickness, and a second slot is formed through the membrane engagement face and has a second slot depth that is less than the screen thickness. The first slot and the second slot intersect to fluidly connect the hydraulic circuit with the liquid volume.

In yet another aspect, a flow control screen includes a screen body having first and second opposing faces defining a screen thickness. A first slot is formed through the first opposing face and has a first slot depth that is less than the screen thickness. A second slot is formed through the second opposing face and has a second slot depth that is less than the screen thickness. The first slot defines a first pattern and the second slot defines a second pattern that is different than the first pattern. The first slot and the second slot intersect to form a fluid passage through the screen body.

In yet another aspect, a method of manufacturing a flow control screen is provided. The flow control screen includes a screen body having first and second opposing faces defining a screen thickness. The method includes a step of machining a first slot, which defines a first pattern, through the first opposing face having a first slot depth that is less than the screen thickness. The method also includes a step of machining a second slot through the second opposing face having a second slot depth that is less than the screen thickness. The second slot defines a second pattern that is different than the first pattern. One of the machining steps includes intersecting the first slot and the second slot to form a fluid passage through the screen body.

DETAILED DESCRIPTION

Figure 1:
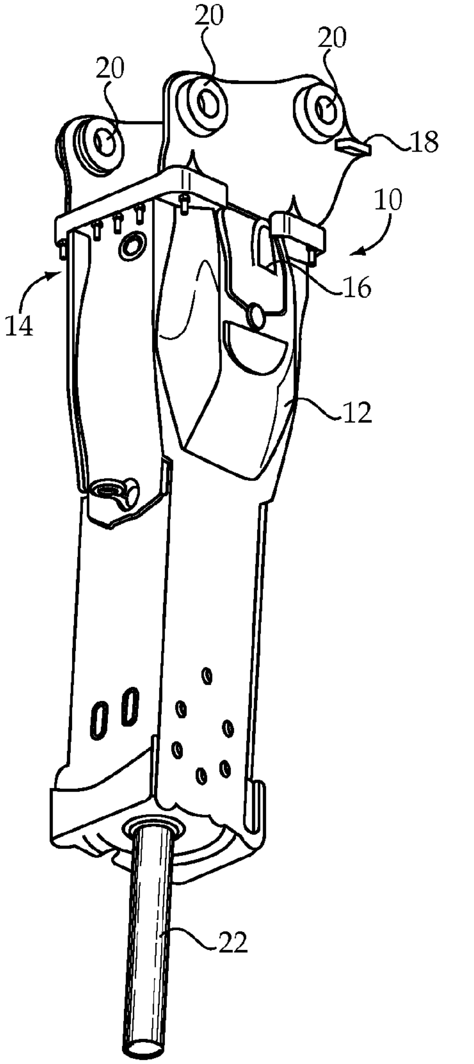
FIG. 1 is a perspective view of a hydraulic hammer, according to the present disclosure.

Referring now to FIG. 1, an exemplary hydraulic hammer 10 includes an elongate housing 12 defining a hydraulic inlet 14 and a hydraulic outlet 16 that may be connected to a hydraulic implement system of a machine, such as an excavator, backhoe loader, skid steer or the like. A machine mount 18 may be attached to one end of the elongate housing 12 and may include a plurality of pin receiving bores 20 that are distributed in a pattern to match the boom attachment features of an associated machine. A work tool 22 is partially received in, and movable with respect to, the elongate housing 12 and may be used to contact a work surface in operations such as, for example, concrete demolition, trenching, or the breaking of frozen or hard ground.

Figure 2:
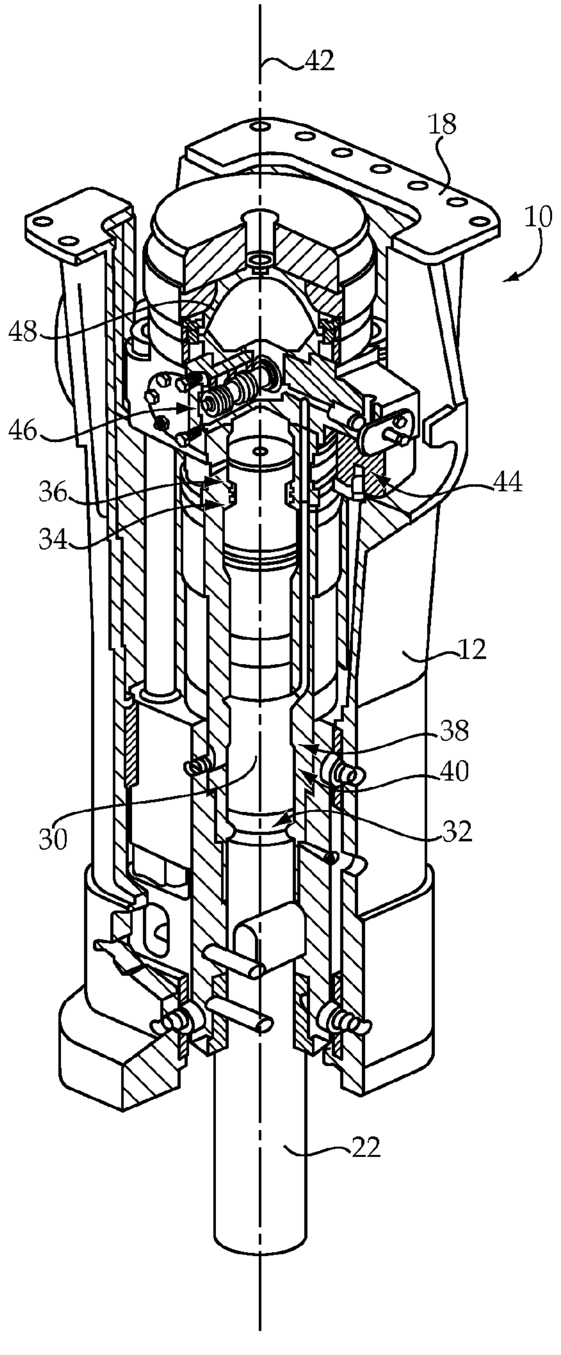
FIG. 2 is a partially sectioned side view of the hydraulic hammer of FIG. 1

Referring now to FIG. 2, the work tool 22 may be driven to reciprocate by being impacted by a piston 30 that is driven to move between a downward stroke position in contact with an impact surface 32 of the work tool 22 (as shown) and an upward stroke position out of contact with the work tool 22. The piston 30 includes a downward hydraulic surface 34 exposed to fluid pressure in an upper hydraulic chamber 36, and an upward hydraulic surface 38 exposed to fluid pressure in a lower hydraulic chamber 40. Downward hydraulic surface 34 has a larger effective surface area than upward hydraulic surface 38 so that piston 30 is driven downward along a centerline 42 when the upper hydraulic chamber 36 is fluidly connected to the high pressure hydraulic inlet 14. A hydraulic circuit 44 is supported within the elongate housing 12 and is configured to direct pressurized hydraulic fluid to move the piston 30 between the upward stroke position and the downward stroke position. In particular, the hydraulic circuit 44 may include a spool switching valve member 46 movable between a first position at which the upper hydraulic chamber 36 is fluidly connected to the high pressure of hydraulic inlet 14, and a second position at which the upper hydraulic chamber 36 is fluidly connected to the low pressure of hydraulic outlet 16.

Figure 3:
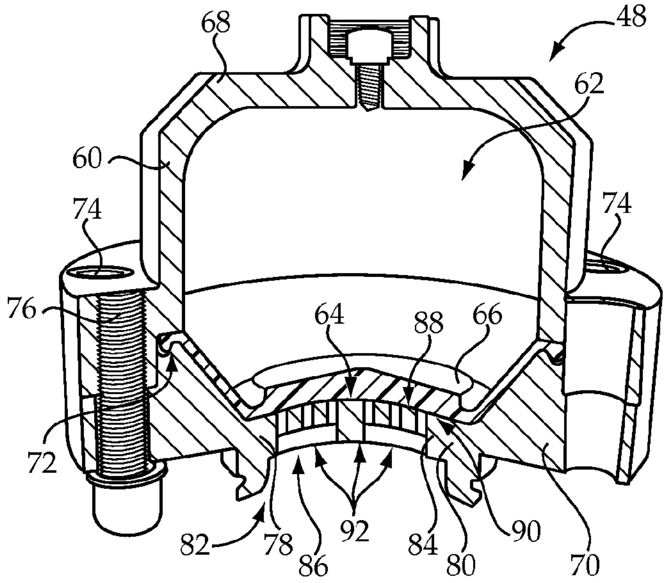
FIG. 3 is a sectioned side view of the hydraulic accumulator of FIG. 2.

The hydraulic hammer 10 may also include a hydraulic accumulator 48 fluidly connected with the hydraulic circuit 44. Although the hydraulic accumulator 48 is shown fluidly connected with the upper hydraulic chamber 36, it should be appreciated that one or more hydraulic accumulators may be positioned at various locations along the hydraulic circuit 44 to store pressurized hydraulic fluid, dampen hydraulic shocks or pulsations, and/or assist in piston reciprocation. Turning now to FIG. 3, the hydraulic accumulator 48, according to the exemplary embodiment, may include an accumulator housing 60 defining a gas reservoir 62, which may include a volume of nitrogen, and a liquid volume 64. A flexible membrane 66, such as an elastomeric membrane, is positioned within the accumulator housing 60 and separates the gas reservoir 62 and the liquid volume 64. According to the exemplary embodiment, the accumulator housing 60 may include an upper half 68 and a lower half 70 that, when joined together, may clamp or otherwise secure an outer edge 72 of the flexible membrane 66. Fastener bores 74 may be positioned through the accumulator 48, such as around the periphery, for receiving fasteners, such as exemplary fastener 76, used to secure the upper and lower halves 68 and 70 together and/or secure a position of the hydraulic accumulator 48 relative to the hydraulic hammer housing 12.

Figure 4:
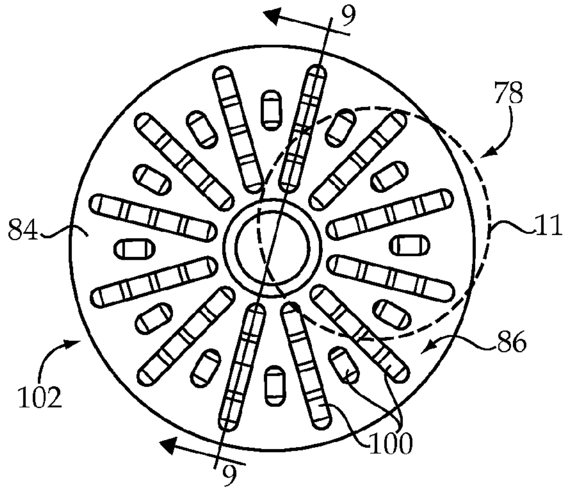
FIG. 4 is a bottom diagrammatic view of a flow control screen, illustrating an exemplary slot pattern.

A flow control screen 78, shown in FIG. 4, may be incorporated into the accumulator housing 60. For example, and referring also to FIG. 3, the flow control screen 78 may define a wall 80, or partial wall, of the lower half 70 of the accumulator housing 60 and may control a fluid flow between an exterior 82 of the hydraulic accumulator 48, which may include the upper hydraulic chamber 36 of the hydraulic circuit 44, and the liquid volume 64 within the hydraulic accumulator 48. The flow control screen 78 may include a screen body 84, which may define the accumulator housing wall 80, having a first, or exterior, face 86 and a second, or membrane engagement, face 88. When used in the hydraulic accumulator 48, the exterior face 86 may interface with hydraulic fluid in the hydraulic circuit 44, while the membrane engagement face 88 may support a liquid side 90 of the flexible membrane 66. The liquid side 90 of the flexible membrane 66 may, in some states of the hydraulic circuit 44, contact the membrane engagement face 88, while, in other states, hydraulic fluid pressure may urge the flexible membrane 66 away from the membrane engagement face 88. Fluid passages 92 of the flow control screen 78, which will be described in greater detail below, may be provided through the wall 80 or, more specifically, the screen body 84 to fluidly connect the exterior 82 of the hydraulic accumulator 48 with the liquid volume 64.

Figure 5:
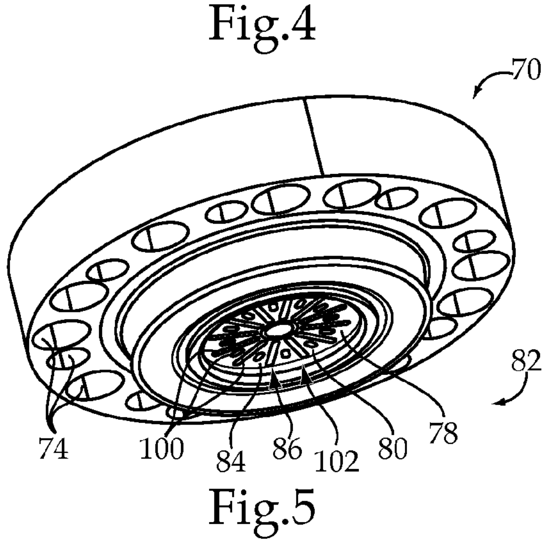
FIG. 5 is a bottom perspective view of the bottom half of the hydraulic accumulator of FIG. 3, incorporating the flow control screen of FIG. 4.

As shown in FIG. 4, which shows the flow control screen 78, and FIG. 5, which shows the flow control screen 78 incorporated into the hydraulic accumulator 48, at least one slot 100 defining a first pattern 102 may be formed through the exterior face 86 of the flow control screen 78. For example, the first pattern 102 may include a plurality of linear slots 100, as shown. Specifically, for example, the first pattern 102 may include a set of radially oriented slots 100 formed through the exterior face 86. As shown, the first pattern 102 may include radially oriented slots 100 having varying lengths. Although the number, size, and arrangement of slots, such as slots 100, constituting the first pattern 102 may vary, it is preferred that the slots 100 extend only partially through the flow control screen 78. In particular, the slots 100 of the first pattern 102, alone, do not provide a fluid connection between the exterior 82 and the liquid volume 64.

Figure 6:
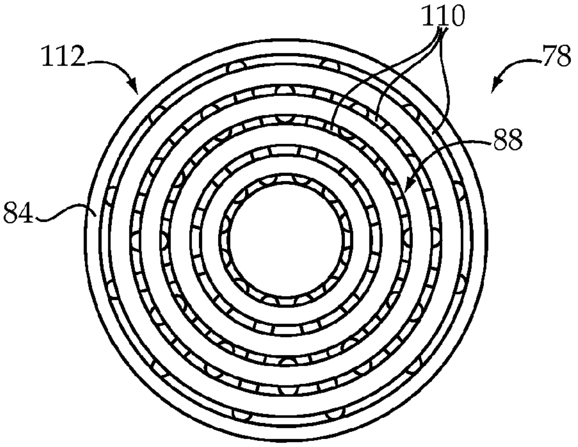
FIG. 6 is a top diagrammatic view of the flow control screen of FIG. 4, illustrating another exemplary slot pattern.
Figure 7:
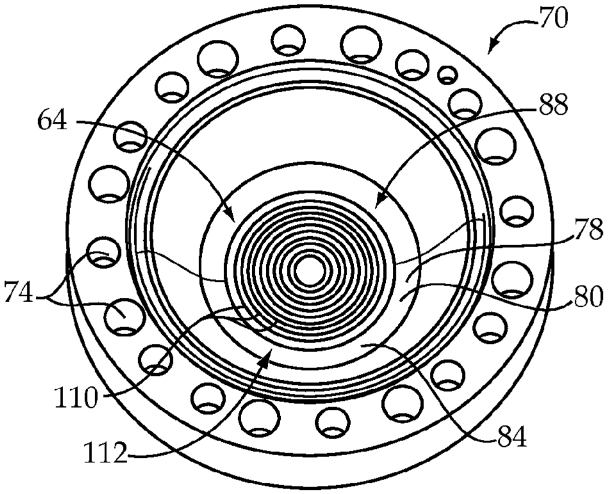
FIG. 7 is a top perspective view of the bottom half of the hydraulic accumulator of FIG. 3, incorporating the flow control screen of FIG. 6.
Figure 8:
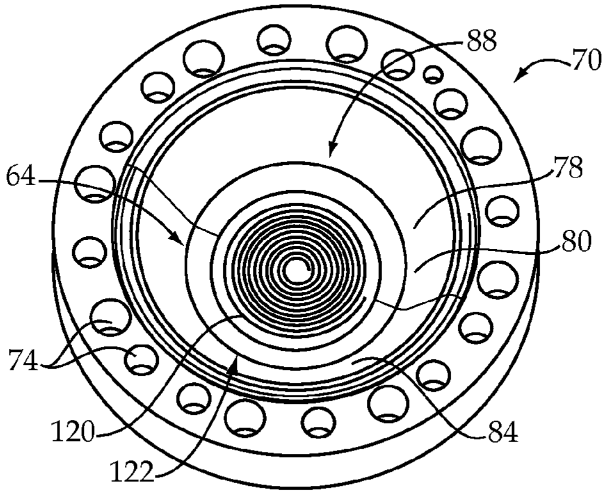
FIG. 8 is a top perspective view similar to FIG. 7, illustrating yet another exemplary slot pattern.

Turning now to FIG. 6, which shows an opposing side of the flow control screen 78, and FIG. 7, which shows the flow control screen 78 incorporated into the hydraulic accumulator 48, at least one slot 110 defining a second pattern 112 may be formed through the membrane engagement face 88 of the flow control screen 78. For example, the second pattern 112 may include one or more curved slots 110. Specifically, the second pattern 112 may include a set of concentric circular slots 110 formed through the membrane engagement face 88. For example, a lathe may be used to machine the plurality of concentric slots or grooves 110 through the membrane engagement face 88. According to another embodiment, shown in FIG. 8, an alternative pattern 120 may include a continuous spiral slot 122, which may be machined using a mill, through the membrane engagement face 88. Although the number, size, and arrangement of slots, such as slots 110 or 122, constituting a pattern, such as patterns 112 or 120, through the membrane engagement face 88 may vary, it is preferred that the slots, such as slots 110 or 122, extend only partially through the flow control screen 78. In particular, the slots 110 or 122 of respective patterns 112 and 120, alone, do not provide a fluid connection between the exterior 82 and the liquid volume 64.

Figure 9:
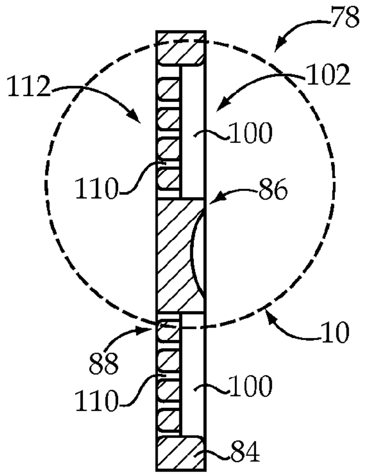
FIG. 9 is a sectioned view through lines 9-9 of FIG. 4, according to the slot patterns of FIGS. 4 and 6.
Figure 10:
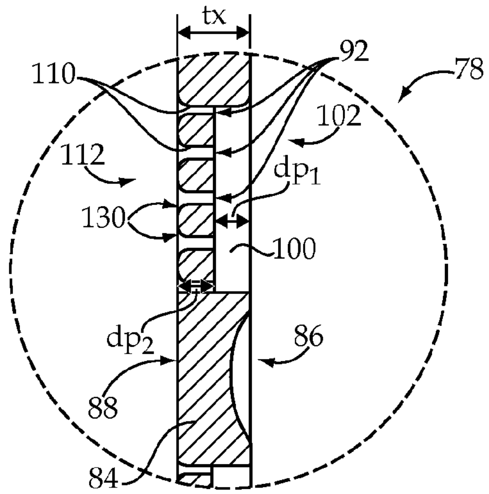
FIG. 10 is an enlarged view of a portion of FIG. 9.
Figure 11:
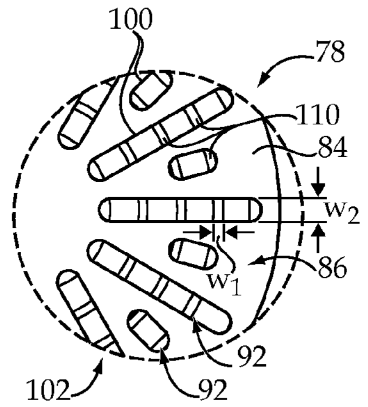
FIG. 11 is an enlarged view of a portion of FIG. 4.

As shown in FIGS. 9-11, and according to the slot patterns 102 and 112 of FIGS. 4-7, the first pattern 102 of slots 100 and the second pattern 112 of slots 110 intersect at one or more locations to define the fluid passages 92 through the flow control screen 78 and, according to the exemplary embodiment, would fluidly connect the exterior 82 with the liquid volume 64. Thus, according to preferred embodiments, the first pattern 102 of slots 100 or grooves may be machined through the exterior face 86, while a different second pattern 112 of slots 110 or grooves may be machined through the membrane engagement face 88. The slots 100 of the first pattern 102 may each have a first slot depth $dp_1$ that is less than a screen, or wall, thickness tx, and the slots 110 of the second pattern 112 may each have a second slot depth $dp_2$ that is less than the screen thickness tx. However, the slots 100 and 110 of the different respective patterns 102 and 112 have depths $dp_1$ and $dp_2$ sufficient to form intersections defining the fluid passages 92 through the body 84 of the flow control screen 78. According to a specific example, the slots 100 and 110 of each of the patterns 102 and 112 may have slot depths $dp_1$ and $dp_2$ that are equal to half the screen thickness tx.

As stated above, the first and second patterns 102 and 112, or, alternatively, pattern 122, may vary and, thus, may include any number, shape, size, and configuration of slots, including linear and/or curved slots. The patterns 102 and 112 may be selected such that intersections define fluid passages, such as passages 92, capable of providing a desired flow area compatible with a desired flow rate for the application. The patterns 102 and 112 may be selected based on the ease of the machining the particular pattern. Further, particular patterns may be preferred on particular sides of the screen body 84. For example, a particular pattern of slots through the membrane engagement face 86 may be selected such that a sufficient surface area remains to provide desired support for the flexible membrane 66. According to the exemplary use provided herein, it may also be desirable to form the slots 110 of the second pattern 112 to include rounded edges 130 at the membrane engagement face 88 to minimize damage to the flexible membrane 66 during extreme fluid pressure fluctuations. For similar purposes, the slots 110 of the second pattern 112 may have a width $w_1$ that is smaller than a width $w_2$ of the slots 100 of the first pattern 102.

INDUSTRIAL APPLICABILITY

The present disclosure finds potential application in flow control screens, such as, for example, flow control screens used in a variety of fluid control applications. Further, the present disclosure may be applicable to a method for manufacturing such flow control screens. Yet further, the present disclosure may be applicable to a manufacturing method and resulting flow screen offering reduced manufacturing costs. Such flow control screens may be used in a variety of fluid systems. As such, a hydraulic accumulator, which may be used in a hydraulic hammer application, incorporating such a flow control screen is provided for exemplary purposes only.

Referring generally to FIGS. 1-11, a flow control screen 78, which, according to one example, may define a wall 80 of a lower half 70 of an accumulator housing 60, may control a fluid flow between an exterior 82 of a hydraulic accumulator 48 and a liquid volume 64 within the hydraulic accumulator 48. The flow control screen 78 may include a screen body 84, which may define the accumulator housing wall 80, having an exterior face 86 and a membrane engagement face 88. The exterior face 86 may interface with hydraulic fluid in the hydraulic circuit 44, while the membrane engagement face 88 may support a liquid side 90 of the flexible membrane 66.

At least one slot 100 defining a first pattern 102 may be formed through the exterior face 86 of the flow control screen 78, while at least one slot 110 defining a second pattern 112 may be formed through the membrane engagement face 88 of the flow control screen 78. The first pattern 102 of slots 100 and the second pattern 112 of slots 110, which are different, intersect at one or more locations to define fluid passages 92 through the flow control screen 78 and, according to the exemplary embodiment, fluidly connect the exterior 82 with the liquid volume 64. For example, the slots 100 of the first pattern 102 may each have a first slot depth $dp_1$ that is less than a screen, or wall, thickness tx, and the slots 110 of the second pattern 112 may each have a second slot depth $dp_2$ that is less than the screen thickness tx. However, the slots 100 and 110 of the different respective patterns 102 and 112 have depths $dp_1$ and $dp_2$ sufficient to form intersections defining the fluid passages 92 through the body 84 of the flow control screen 78.

The flow control screen and manufacturing method described herein disclose a means for providing a fluid flow device at a significantly reduced manufacturing cost. In particular, the flow control screen may be manufactured using known means for machining different patterns of grooves or slots through opposing faces of the fluid flow structure. The grooves of the opposing patterns have depths such that the opposing slots intersect in numerous locations to define fluid passages through the flow control screen. Conventional manufacturing methods for creating such a device include drilling a large number of discrete holes through the flow control screen to create the fluid passages. When compared to these conventional methods, the method disclosed herein may significantly reduce the time and costs associated with providing the appropriate flow control.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A hydraulic accumulator, comprising:
- an accumulator housing defining a gas reservoir and a liquid volume;
- a flexible membrane positioned within the accumulator housing and separating the gas reservoir and the liquid volume; and
- a flow control screen having a screen thickness and including an exterior face opposing a membrane engagement face,
- wherein a first set of slots is formed in the exterior face and has a first slot depth that is less than the screen thickness, the first set of slots is elongated and radially oriented from a center portion of the flow control screen,
- wherein a second set of slots is formed in the membrane engagement face and has a second slot depth that is less than the screen thickness, the second set of slots includes continuous, concentric circular slots, and
- wherein the first set of slots and the second set of slots intersect to fluidly connect an exterior of the accumulator housing with the liquid volume.

2. The hydraulic accumulator of claim 1, wherein the first set of slots defines a first pattern and the second set of slots defines a second pattern that is different than the first pattern.

3. The hydraulic accumulator of claim 2, wherein edges defining a slot of the second set of slots at the membrane engagement face are rounded.

4. The hydraulic accumulator of claim 1, wherein the first set of slots include slots that are elongated in varying lengths.

5. The hydraulic accumulator of claim 1, wherein the first and second set of slots intersect at one or more locations.

6. The hydraulic accumulator of claim 1, wherein the first and second set of slots each have depths that equal half the screen thickness.

7. The hydraulic accumulator of claim 1, wherein the first and second set of slots each have depths sufficient to intersect and fluidly connect with each other.

8. A hydraulic hammer, comprising:

an elongate housing defining a centerline;

a work tool partially received in, and movable along the centerline with respect to, the elongate housing;

a piston received in the housing and movable along the centerline between a downward stroke position in contact with the work tool and an upward stroke position out of contact with the work tool;

a hydraulic circuit supported within the elongate housing and configured to direct pressurized hydraulic fluid to move the piston between the upward stroke position and the downward stroke position; and a hydraulic accumulator fluidly connected with the hydraulic circuit, wherein the hydraulic accumulator includes an accumulator housing defining a gas reservoir and a liquid volume, a flexible membrane positioned within the accumulator housing and separating the gas reservoir and the liquid volume, and a flow control screen defining a wall of the accumulator housing;

wherein the flow control screen has a screen thickness and includes an exterior face opposing a membrane engagement face, wherein a first set of slots is formed in the exterior face and has a first slot depth that is less than the screen thickness, the first set of slots is elongated and radially oriented from a center portion the flow control screen, wherein a second set of slots is formed in the membrane engagement face and has a second slot depth that is less than the screen thickness, the second set of slots includes continuous, concentric circular slots, and wherein the first set of slots and the second set of slots intersect to fluidly connect the hydraulic circuit with the liquid volume.

9. The hydraulic hammer of claim 8, wherein the piston includes a downward hydraulic surface exposed to fluid pressure in an upper hydraulic chamber and an upward hydraulic surface exposed to fluid pressure in a lower hydraulic chamber, wherein the hydraulic accumulator is fluidly connected with the upper hydraulic chamber.

10. The hydraulic hammer of claim 8, wherein the first set of slots defines a first pattern and the second set of slots defines a second pattern that is different than the first pattern.

11. The hydraulic hammer of claim 8, wherein edges defining the second set of slots at the membrane engagement face are rounded.

12. A flow control screen, comprising:

a screen body having first and second opposing faces defining a screen thickness;

a first set of slots formed in the first opposing face and having a first slot depth that is less than the screen body thickness, the first set of slots is elongated and radially oriented from a center portion the flow control screen; and a second set of slots formed in the second opposing face and having a second slot depth that is less than the screen body thickness, the second set of slots includes continuous concentric circular slots;

wherein the first set of slots defines a first pattern and the second set of slots defines a second pattern that is different than the first pattern; and wherein the first set of slots and the second set of slots intersect to form a fluid passage through the screen body.

13. The flow control screen of claim 12, wherein the first slot depth and the second slot depth are each equal to half of the screen thickness.

14. The flow control screen of claim 12, wherein the first set of slots include slots that are elongated in varying lengths.

15. The flow control screen of claim 12, wherein the first and second set of slots intersect at one or more locations.

16. The flow control screen of claim 12, wherein the first and second set of slots each having depths that equal half the screen thickness.

17. The flow control screen of claim 12, wherein the first and second set of slots each have depths sufficient to intersect and fluidly connect with each other.

* * * * *